(12) United States Patent
Guilford et al.

(10) Patent No.: US 9,516,587 B2
(45) Date of Patent: *Dec. 6, 2016

(54) INTELLIGENT NETWORK SELECTION BASED ON QUALITY OF SERVICE AND APPLICATIONS OVER DIFFERENT WIRELESS NETWORKS

(71) Applicant: AT&T Mobility II LLC, Atlanta, GA (US)

(72) Inventors: Ann C. Guilford, Redmond, WA (US); Mike Verstegan, Redmond, WA (US); Hong Zhao, Redmond, WA (US)

(73) Assignee: AT&T Mobility II LLC, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/887,076

(22) Filed: Oct. 19, 2015

(65) Prior Publication Data
US 2016/0044592 A1    Feb. 11, 2016

Related U.S. Application Data

(60) Continuation of application No. 14/500,505, filed on Sep. 29, 2014, now Pat. No. 9,167,513, which is a continuation of application No. 12/197,830, filed on Aug. 25, 2008, now Pat. No. 8,849,276, which is a division of application No. 09/752,487, filed on Dec. 29, 2000, now Pat. No. 7,433,929.

(51) Int. Cl.
| | | |
|---|---|---|
| *H04W 4/00* | (2009.01) | |
| *H04W 36/00* | (2009.01) | |
| *H04W 48/18* | (2009.01) | |
| *H04W 28/08* | (2009.01) | |
| *H04W 28/24* | (2009.01) | |
| *H04W 28/02* | (2009.01) | |
| *H04M 15/00* | (2006.01) | |

(52) U.S. Cl.
CPC ......... *H04W 48/18* (2013.01); *H04M 15/8038* (2013.01); *H04W 28/0247* (2013.01); *H04W 28/08* (2013.01); *H04W 28/24* (2013.01); *H04M 2215/34* (2013.01)

(58) Field of Classification Search
CPC .................................................... H04W 48/18
USPC .... 455/403, 432.1, 435.2; 370/331; 709/217
See application file for complete search history.

(56) References Cited

U.S. PATENT DOCUMENTS

| | | |
|---|---|---|
| 5,159,625 A | 10/1992 | Zicker |
| 5,479,481 A | 12/1995 | Koivunen |
| 5,625,884 A | 4/1997 | Gitlin et al. |
| 5,761,621 A | 6/1998 | Sainton |
| 5,828,959 A | 10/1998 | Soderbacka |

(Continued)

*Primary Examiner* — Christopher M Brandt

(57) ABSTRACT

A system and method for selecting a wireless network is disclosed. The method relates to selecting a wireless network from plurality of wireless networks. A variation of the invention includes selecting a new platform from a plurality of platforms offered by the current service provider according to a service request from the wireless device. The method comprises determining a requested service associated with the wireless device, determining whether one of the plurality of wireless networks can provide the requested service, and, if one of the plurality of wireless networks can provide the requested service, choosing the one wireless network of the plurality of wireless networks. The method further involves using a variety of parameters in determining which wireless network to choose for servicing the requested service from the wireless device.

20 Claims, 9 Drawing Sheets

(56) References Cited

U.S. PATENT DOCUMENTS

| | | | |
|---|---|---|---|
| 5,832,367 | A | 11/1998 | Bamburak et al. |
| 5,875,186 | A | 2/1999 | Belanger et al. |
| 5,901,352 | A | 5/1999 | St.-Pierre et al. |
| 5,905,955 | A | 5/1999 | Bamburak et al. |
| 5,915,214 | A | 6/1999 | Reece et al. |
| 6,016,427 | A | 1/2000 | Barber et al. |
| 6,023,501 | A | 2/2000 | Wakamatsu |
| 6,047,180 | A | 4/2000 | Coutant |
| 6,049,549 | A | 4/2000 | Ganz et al. |
| 6,052,449 | A | 4/2000 | Chavez, Jr. |
| 6,085,085 | A | 7/2000 | Blakeney et al. |
| 6,085,110 | A | 7/2000 | Nilsson |
| 6,101,379 | A | 8/2000 | Rahman et al. |
| 6,101,387 | A | 8/2000 | Granberg et al. |
| 6,108,540 | A | 8/2000 | Sonti et al. |
| 6,128,503 | A | 10/2000 | Granberg et al. |
| 6,167,250 | A | 12/2000 | Rahman et al. |
| 6,169,896 | B1 | 1/2001 | Sant et al. |
| 6,199,066 | B1 | 3/2001 | Glitho et al. |
| 6,219,557 | B1 | 4/2001 | Havinis |
| 6,226,277 | B1 | 5/2001 | Chuah |
| 6,256,497 | B1 | 7/2001 | Chambers |
| 6,314,108 | B1 | 11/2001 | Ramasubramani et al. |
| 6,345,090 | B1 | 2/2002 | Walker et al. |
| 6,347,091 | B1 | 2/2002 | Wallentin et al. |
| 6,374,109 | B1 | 4/2002 | Shaheen et al. |
| 6,374,112 | B1 | 4/2002 | Widegren et al. |
| 6,377,548 | B1 | 4/2002 | Chuah |
| 6,377,787 | B1 | 4/2002 | Bamburak et al. |
| 6,377,804 | B1 | 4/2002 | Lintulampi |
| 6,393,290 | B1 | 5/2002 | Ufongene |
| 6,397,064 | B1 | 5/2002 | Bridges et al. |
| 6,400,946 | B1 | 6/2002 | Vazvan et al. |
| 6,415,148 | B1 | 7/2002 | Chiniga et al. |
| 6,418,324 | B1 | 7/2002 | Doviak et al. |
| 6,434,388 | B1 | 8/2002 | Szalajski |
| 6,453,161 | B1 | 9/2002 | Touati et al. |
| 6,466,802 | B1 | 10/2002 | Blakeney et al. |
| 6,469,991 | B1 | 10/2002 | Chuah |
| 6,473,404 | B1 | 10/2002 | Kaplan et al. |
| 6,493,551 | B1 | 12/2002 | Wang et al. |
| 6,496,704 | B2 | 12/2002 | Yuan |
| 6,496,707 | B1 | 12/2002 | Chu et al. |
| 6,516,192 | B1 | 2/2003 | Spaur et al. |
| 6,522,628 | B1 | 2/2003 | Patel et al. |
| 6,522,883 | B2 | 2/2003 | Titmuss et al. |
| 6,546,246 | B1 | 4/2003 | Bridges et al. |
| 6,546,247 | B1 | 4/2003 | Foti et al. |
| 6,574,477 | B1 | 6/2003 | Rathunde |
| 6,580,700 | B1 | 6/2003 | Pinard et al. |
| 6,584,311 | B1 | 6/2003 | Sorenson et al. |
| 6,584,312 | B1 | 6/2003 | Morin et al. |
| 6,591,103 | B1 | 7/2003 | Dunn et al. |
| 6,594,242 | B1 | 7/2003 | Kransmo |
| 6,600,903 | B1 | 7/2003 | Lilja et al. |
| 6,608,832 | B2 | 8/2003 | Forslow |
| 6,625,451 | B1 | 9/2003 | La Medica et al. |
| 6,654,786 | B1 | 11/2003 | Fox et al. |
| 6,684,082 | B1 | 1/2004 | McClure |
| 6,690,929 | B1 | 2/2004 | Yeh |
| 6,691,173 | B2 | 2/2004 | Morris et al. |
| 6,697,620 | B1 | 2/2004 | Lamb et al. |
| 6,853,648 | B1 | 2/2005 | Krstanovski et al. |
| 6,934,558 | B1 | 8/2005 | Sainton et al. |
| 6,961,583 | B2 | 11/2005 | Moles et al. |
| 7,433,929 | B2 | 10/2008 | Guilford et al. |
| 2001/0031635 | A1 | 10/2001 | Bharatia |
| 2006/0116127 | A1 | 6/2006 | Wilhoite et al. |

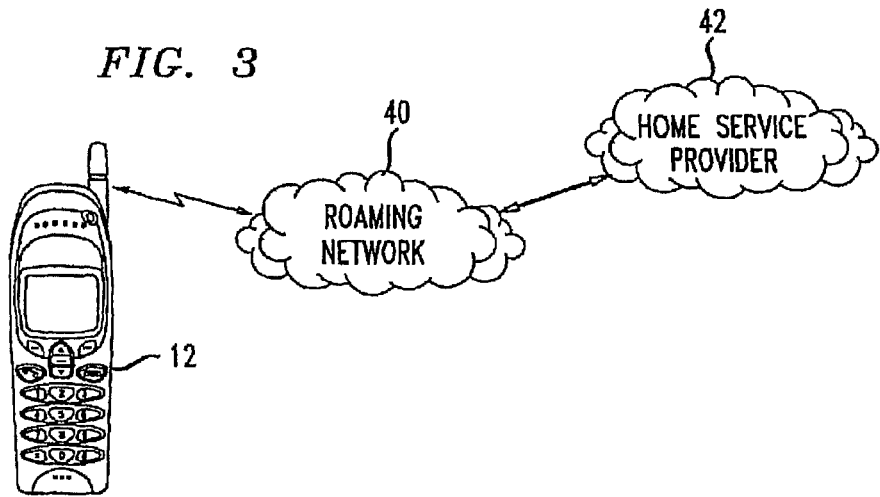

| THE 1st PREFERRED ROAMING PARTNER ON 2G NW | THE 1st PREFERRED VOICE ROAMING PARTNER ON 3G NW | THE 1st PREFERRED ROAMING PARTNER ON A QoSi |
|---|---|---|
| THE 2nd PREFERRED ROAMING PARTNER ON 2G NW | THE 2nd PREFERRED VOICE ROAMING PARTNER ON 3G NW | THE 2nd PREFERRED ROAMING PARTNER ON A QoSi |
| THE 3rd PREFERRED ROAMING PARTNER ON 2G NW | THE 3rd PREFERRED VOICE ROAMING PARTNER ON 3G NW | THE 3rd PREFERRED ROAMING PARTNER ON A QoSi |
| ⋮ | ⋮ | ⋮ |
| THE Nth PREFERRED ROAMING PARTNER ON 2G NW | THE Nth PREFERRED VOICE ROAMING PARTNER ON 3G NW | THE Nth PREFERRED ROAMING PARTNER ON A QoSi |

INTELLIGENT NETWORK SELECTION BASED ON QUALITY OF SERVICE AND APPLICATIONS OVER DIFFERENT WIRELESS NETWORKS

This application is a continuation of U.S. patent application Ser. No. 14/500,505, filed Sep. 29, 2014, now U.S. Pat. No. 9,167,513, which is a continuation of U.S. patent application Ser. No. 12/197,830, filed Aug. 25, 2008, now U.S. Pat. No. 8,849,276, which is a divisional of U.S. patent application Ser. No. 09/752,487, filed Dec. 29, 2000, now U.S. Pat. No. 7,433,929, all of which are herein incorporated by reference in their entirety.

FIELD OF THE INVENTION

The present invention relates generally to wireless networks and more specifically to a system and method of selecting specific networks for wireless services based on predetermined parameters such as quality of service.

DISCUSSION OF RELATED ART

Wireless systems are being developed and built to handle both voice communication and data communication. Traditionally, wireless devices such as mobile telephones were primarily used for voice communication between users. However, wireless Internet applications are being developed that increase the demand for wireless data communication in addition to voice communication. Wireless networks have evolved to accommodate more data communication. Generally speaking, the first generation of wireless networks transmitted analog voice signals. The second generation (2G) of wireless networks transmits digital voice communication and some limited data communication. High-speed data communication systems are often referred to as third generation (3G) systems with targeted applications or services including but not limited to wireless multi-media services with different requirements on quality of service. This characterization of first, second and third generation is a general description for use in the introduction of the needs in the related art addressed by the present invention.

FIG. 1 illustrates a common multi-network arrangement 10 faced by many wireless service subscribers. Many wireless carriers utilize either a 2G wireless network 16, 18, 20 or a 3G wireless network 22, 24, 26, 28. In some cases, a wireless carrier will operate both a 2G and 3G network and therefore offer a variety of subscriber services through different networks. A wireless device 12, such as a wireless telephone, mobile terminal or the like, or a mobile multi-media device 14, may communicate with a 2G 5 radio system 16 or a 3G radio system 22. The 2G radio system 16 communicates its voice or data signals to a 2G radio transport network 18 to a publicly switched telephone network (PSTN) 20 for communicating telephone calls and data. The 3G radio system 22 communicates with a circuit switched transport network 24 and then the PSTN 20 for telephone calls and may communicated via a packet switched network 26 with a public packed switched data network 28 for high-speed data signals.

Both 2G and 3G networks may use standard interfaces known in the art. Such interfaces include the SS7 MAP interface for the global system for mobile communication (GSM) and the ANSI-41 interface for time divisional multiple access (1'DMA or IS-136) and code division multiple access (CDMA or IS-95). The SS7 MAP interface and ANSI-41 interface generally relate to circuit switched 2G voice/data services. The General Packet Radio Service (GPRS) and Internet Protocol (IP) standard interfaces generally apply to 3G data and multi-media services. Those of ordinary skill in the art understand the operation of these interfaces and the details of their operation are not critical for the present disclosure. Therefore, no more details are provided herein.

In some service areas, both 2G and 3G wireless systems have overlapping coverage. Service requests, i.e., requests for voice, data, e-mail, streaming video, etc., from wireless devices can be satisfied either through a 2G network, 3G network or both networks. When one compares the services offered by the 2G and 3G networks, some applications may only be satisfied at an acceptable level of service through one network.

Similarly, some applications or services can be supported on both network. For example, both 2G and 3G networks service voice communication. However, when voice communication is needed, either the 2G or 3G may be better suited at the time of the request for services, based on cost of service, quality of service, or other factors, to process the voice communication.

Presently, there is no process or system for directing specific service requests to any network other than the network on which the wireless device is presently parked.

Therefore, the present arrangement of wireless networks reduces the likelihood that a request for service from a wireless device will be processed by an optimal network. There is a need in the art for a system and method that directs wireless communication to the appropriate network for improved performance or cost benefits.

The present problem exists for both roaming scenarios and when a wireless device is in a home service area. In a roaming arrangement, the wireless device has a choice of a plurality of wireless networks on which to register. When the wireless device is in a home service area, the home service provider may not provide all of the necessary services available to the wireless device. Thus, if the home service provider only has 2G services, it may have roaming agreements with 3G service providers in the home service area footprint.

As an example of various services being used on different networks, suppose a wireless device transmits a request for data communication services while communicating with a 2G network, but the data communication request may require more bandwidth than the 2G network can deliver. In this case, since the wireless device is communicating with the 2G network, the 2G network will maintain its link to the wireless device and service the request even if it takes longer than it would otherwise on a 3G network.

Roaming agreements between wireless carriers provide the necessary service to their wireless customers regardless of ownership of one type of wireless network. In this regard, a wireless customer may receive various voice and data services whether inside or outside of his or her home service area according to roaming agreements. Furthermore, a subscriber may have a home service provider having a 2G network but be roaming in an area where there is an overlap of 2G and 3G services. Therefore, as 3G networks continue to be deployed, the wireless devices registering with these networks will continue to have a choice of receiving service through 2G or 3G networks.

A wireless device may register with a 3G network but only need to transmit narrow band traffic, such as a telephone call. The 3G network is designed to support wide and narrow band applications, although narrow band communication can be supported efficiently over 3G networks from spectrum efficiency perspective. Assume from this example that while the wireless device uses the 3G network for narrow bandwidth voice communication, the network begins to operate near capacity, say at 90%. If this is the case, the voice communication does not need to be transmitted over the 3G network because such high bandwidth capability is not needed.

In addition, the cost of transmitting data on a 2G or 3G network may differ depending on the time or if special pricing arrangements exist. For example, if a user only needs voice communication services, using a 2G network may be more expensive than a 3G network. Furthermore, some wireless users may be locked into a higher-priced contract agreement and be using 3G services for emails that do not require instant high-speed access. Therefore, there is a need in the art for a method and system to maximize the transmission of voice and data from a wireless device through 2G and/or 3G networks.

Often, different carriers operate various 2G or 3G networks using different frequency spectrum purchased from government agencies. However, not all carriers or services are offered from different frequency bands. Wireless networks or wireless carriers may employ different technologies and services within the same frequency spectrum. For example, a Universal Mobile Telecommunication System (UMTS)

Wideband Code Division Multiple Access (WCDMA) carrier may co-exist in the same spectrum band with Global System for Mobile Communication (GSM), GMSK-GPRS or EDGE-GPRS carriers. A single carrier may offer some or all of these different services within the same or different spectrum band. In this regard, these various services may be termed "platforms" that a carrier provides.

A similar problem exists with the different platforms offered as with the different networks offering different services as discussed above. For example, assume a wireless device is registered with a current service provider and is using the network circuit-switched GSM platform for voice communication. A service, request for multimedia services may be better served through a packet-switched network resource such as GPRS. There is a need for a system or method for transferring the wireless communication link from the current network resource serving the wireless device to a more optimal network resource within the service providers various platforms offered.

Further, even in roaming scenarios, a roaming service provider having a roaming agreement with the home service provider may also have a plurality of different platforms available to roamers. Again, even in the roaming context, a roaming wireless device needs to be able to alter a communication link from one network resource to another within the portfolio of platforms offered by a roaming service provider.

SUMMARY OF THE INVENTION

In order to address the deficiencies and inefficiencies of the related art, the present invention is proposed. What is needed in the art is a system and method for a wireless device to register or link with a particular network or platform based on a certain parameter, for example, network capability associated with a service requested by a wireless device. The term wireless device or mobile station as used herein means any wireless voice, data and/or multimedia device and is not limited to mobile phones, personal digital assistants, laptop computers, or any specific device.

The first embodiment of the present invention relates to a system and method for providing mobile station-directed network selection based on several parameters including quality of service. The second embodiment of the invention, discussed below, relates to the home wireless network, in real time, directing the mobile to register or switch service to a network or platform that can more optimally service the request for service.

In a first aspect of the first embodiment of the invention, the system and method relate to a roaming user of a wireless device. A roaming user is one who takes the wireless device outside the home service area. While roaming, the wireless device determines the network with which it will register to receive service. In a second aspect of the first embodiment, the wireless device will determine which network to register with while in its home service provider area. In either the first aspect or second aspect of the first embodiment of the invention, the wireless device will be switching to either a new network or a different platform available from the same wireless service provider with which the wireless device is parked when a service request is made.

According to the first aspect of the first embodiment of the invention, a system provides network or platform selection based on a variety of parameters including, but not limited to, quality of service. The system includes a wireless device, a base station, a radio network interface, a mobile switching center, a home location register, a publicly switched telephone network, a data network and a packet switched public network. The base station currently servicing the wireless device is a associated with a roaming service provider that communicates with the wireless device's home service provider. 2G and 3G networks use the basic wireless system nodes and various network elements to communicate telephone calls and data between the various nodes and networks. The functionality related to the present invention may be performed by a combination of the network elements. Hardware, software and/or firmware may be used to achieve the present invention. However, as mentioned above, the first embodiment of the invention relates to the mobile station performing the network/platform selection operation, while the second embodiment relates to the home network directing the mobile to register or switch service to a network/platform that can service the request.

According to the first aspect of the first embodiment of the invention wherein the wireless device is roaming outside its home service area, the network downloads a table such as, for example, a routing table, to the wireless device on a periodic basis. The periodic of time between downloads is variable, such as, for example, weekly, monthly, when roaming agreements are modified, upon power-down or power-up. The table guides the mobile station decisions regarding switching networks or platforms associated with a particular service request. The roaming service provider will enable at least some of the conditions for the roaming mobile device to make the final decision as to where to register for service. In some cases, a communication connection between the wireless device and the home service provider enables the dynamic downloading of a new table based on geographic location and on roaming agreements with the home service operator. Dynamic downloading differs from periodic downloading by not being set on a regular basis. For example, some service providers may promote a special deal for data processing for a short period of time, say a few hours. A weekly (periodic) downloading of a table may miss such a deal. A dynamic arrangement may involve downloading a table when such deals arise rather than only on a predetermined schedule.

The second aspect of the first embodiment of the invention relates to the wireless device using a table such as a routing table when in its home service area. In this aspect of the invention, the table downloaded to the wireless device includes various services within the home service provider portfolio of platforms offered and services offered by different network service providers operating within the same footprint as the home service provider. In this regard, typically the home service provider will have roaming-like agreements with service providers having overlapping areas with the home service provider area.

According to the first embodiment of the present invention, a network selection algorithm, as directed by the table, intelligently selects the appropriate network or platform based on at least one or more of the following parameters: the availability of different quality of services, applications supported, traffic load, cost of services, and other business factors such as roaming agreements. The traffic load may be analyzed for both a 2G and 3G networks, for example, if one network is reaching maximum load, a network selection algorithm may cause a wireless device to unload traffic to another network not at its maximum load. Other parameters may also be used and the present invention is not limited to this particular list of parameters.

The second embodiment of the invention relates to a system and method of providing network or platform selection as directed by the home service provider network based on several parameters. The second embodiment contrasts with the first embodiment of the invention in that it provides real-time directions from the network to the wireless device regarding switching networks or platforms based on a current service request. The method may apply when, for example, a certain service provider operates two network layers, such as a 2G network and a 3G network having different network load capabilities or offering different services. The method relates to how a network operator will direct users to different service providers based on different service requests, needs and preferences.

The first aspect of the second embodiment relates to a roaming scenario and the second aspect of the second embodiment relates to a wireless device in its home service area.

The first aspect of the second embodiment of the invention enables multi-national operators in countries that subdivide national licenses that seek to offer single rate plans to direct traffic to networks that offer competitive commercial terms to the home carrier. The method comprises receiving a service request from a wireless device in a roaming service area, establishing a communication link between the wireless device and the home service provider, and downloading instructions from the home service provider related to how to re-register or redirect communication traffic to another wireless carrier or another platform within a single wireless carrier.

The present invention enables mixed-content networks such as networks employing GPRS, GSM, EDGE and IP that transmit both voice and data to have the tools necessary to direct traffic based on the service requested. Examples of the applications available upon which to base traffic direction decisions include, but are not limited to, conventional voice, voice over IP, delay tolerant data, delay intolerant data, and streaming data.

A second aspect of the second embodiment of the invention relates to a user within his or her home coverage area. Although in a home service area, the wireless device requests a service that is offered via another service provider or via a different platform of the home service provider's portfolio than is currently servicing the wireless device. A method according to this aspect of the second embodiment of the invention comprises a method of selecting a wireless network/platform from a plurality of wireless networks/platforms. The decision-making cycle operates on the network and decides where and how to serve the particular subscriber based on a variety of parameters. The method comprises establishing a connection between a wireless device and a home network and directing various applications from the wireless device to different wireless networks/platforms based on parameters associated with a service requested by the wireless device. The parameters may be, for example, traffic model, delay tolerance, intermittent service tolerance, minimum data rate required, cost of service, business agreements, etc.

BRIEF DESCRIPTION OF THE DRAWINGS

The foregoing advantages of the present invention will be apparent from the following detailed description of several embodiments of the invention with reference to the corresponding accompanying drawings, in which:

FIG. 3 illustrates a wireless device communicating with its home service provider through a roaming serving provider;

FIG. 4 is an exemplary roaming table;

DETAILED DESCRIPTION OF THE INVENTION

Figure 1:
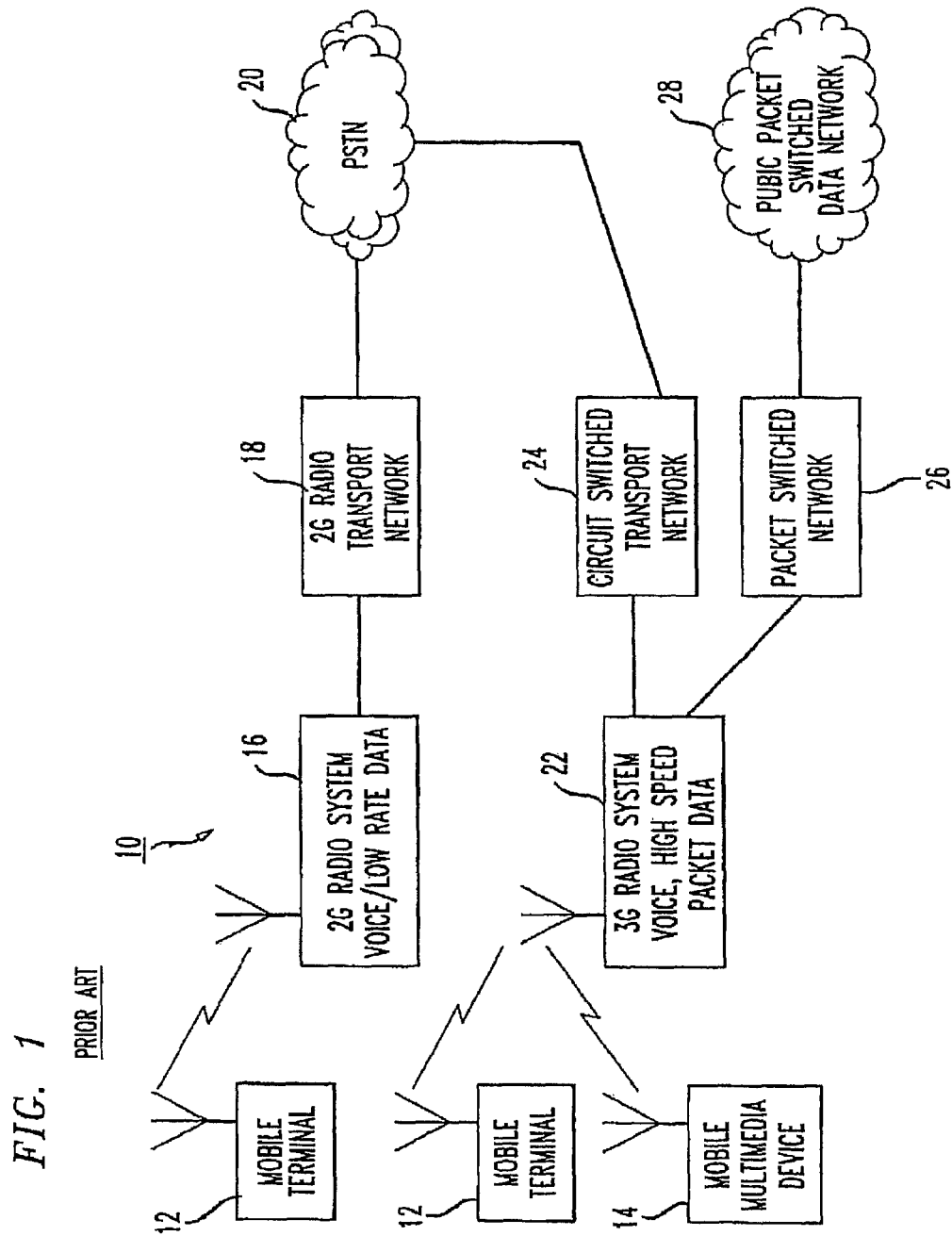
FIG. 1 illustrates a prior art wireless network in which each wireless device registers with a single network.

The present invention is described with reference to the attached drawings. The first embodiment of the invention relates to a system and method for selecting a wireless network according to a wireless device-based decision making process. The second embodiment of the invention, discussed below, relates to a system and method of using the wireless network to decide whether to switch service providers or platforms upon a service request.

With the present invention, a wireless device user has the capability to direct different applications (wireless device service requests) over different networks or platforms. Preferably, in one aspect of the invention, the wireless device transmits low bandwidth applications on 2G networks rather than unnecessarily loading 3G networks. The decision-making process for making this transfer is based in one aspect of the invention on network load requirements. For example, suppose a 3G network and 2G network both serve the same geographic area. Next, suppose a user is communicating with the 3G network for voice services, but the 3G network is at 90% capacity. The network service carrier may wish to unload the user's low-bandwidth communication to a 2G network to leave more resources on the 3G network to serve high-bandwidth demand customers.

Thus, if one user is using a 3G network for low bandwidth services, and another user is on a 2G network and requests high bandwidth services, the present invention enables the service provider operators to swap the networks serving the users according to their service bandwidth requirements. An advantage of the invention includes empowering network carriers with the tools to direct network traffic based on the application used, or service requested, to the appropriate network. The invention is not limited to a wireless device establishing a communication link with only a single wireless network. Accordingly, given the examples discussed herein, a wireless device may use a first wireless network for voice communication, and if a service request is received by the first network involving data communication that will demand more bandwidth, the invention enables that service request to be accomplished via a second communication link with a second network that will more efficiently process the data communication request. Various factors or parameters are used when making the direction decision. These factors include different characteristics associated with the service request, such as: delay tolerance, intermittent service tolerance, minimum data rate needed, cost of service, business agreements, etc.

Quality of service relates to a particular service request. For example if a user subscribes to a service bucket (collection of services), he or she probably would like to pay $50 for guaranteed minimums of 50 kbps data or someone else may want to pay $100 per month for 384 kbps. These data profiles will be involved in decision-making, traffic, or service-stealing processes across different platforms or networks.

We now turn to the first embodiment of the invention and its various aspects. A first aspect of the first embodiment of the invention relates to a wireless device-based algorithm to choose networks or platforms in a roaming scenario. The second aspect of the first embodiment of the present invention relates to wireless device-based network selection in a home servicing area network.

Mobile-Based Network Selection while Roaming

Figure 2:
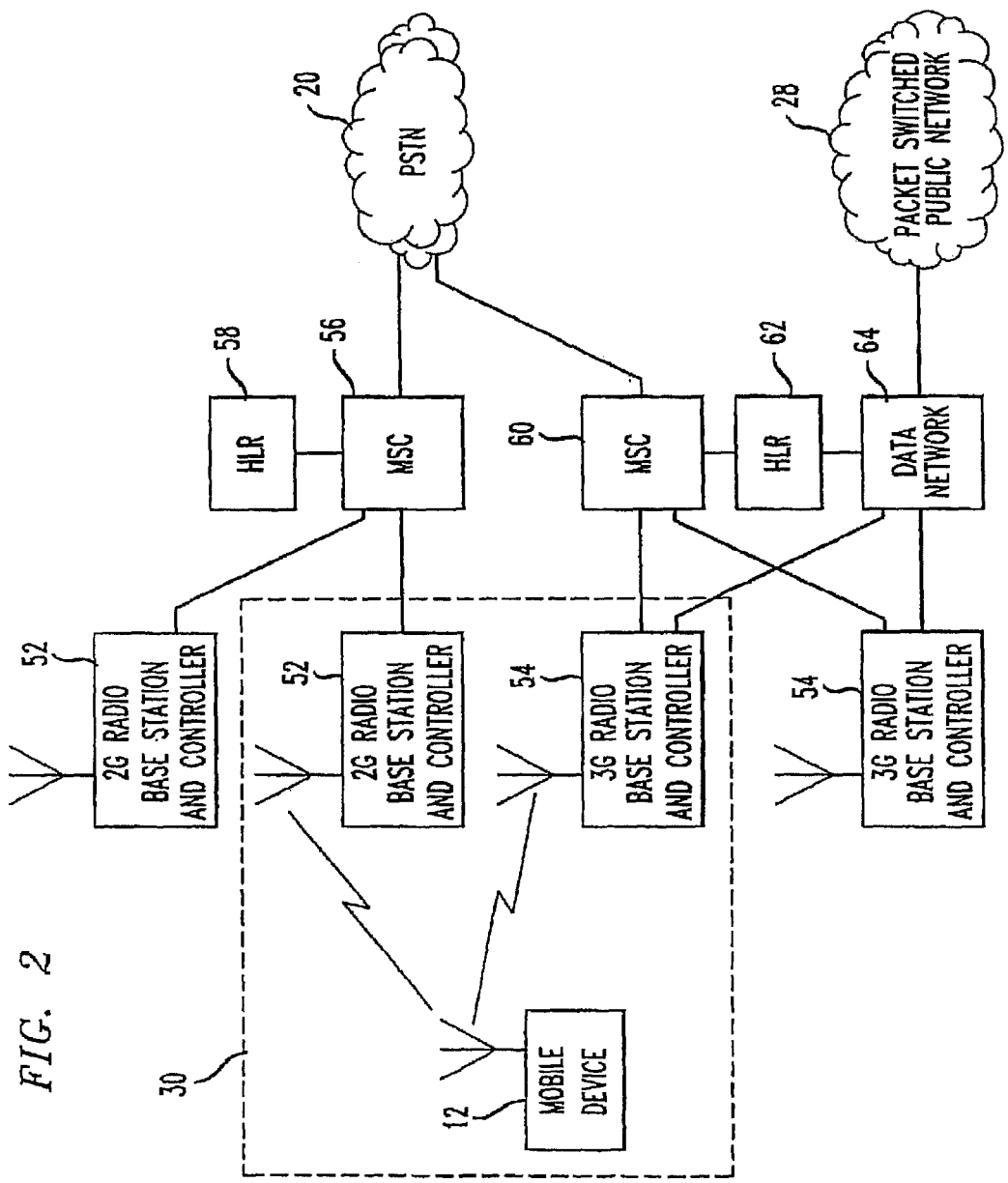
FIG. 2 shows an example of a wireless device in an area covered by both 2G and 3G networks.

FIG. 2 illustrates the first embodiment of the invention related to a system for providing wireless device-based network selection. Assume that the wireless device 12 is in a roaming service area 30 outside of its home service area. The wireless device 12 is assistant (PDA) Accordingly, the wireless device 12 referred to herein may be any wireless electronic device that may communicate with a wireless network. As is known, the wireless device 12 has an operation unit (not shown) comprising hardware and software, Furthermore, the wireless network disclosed herein may be a private or public network and is not limited to any specific kind or standard network existing now or in the future.

As shown in FIG. 2, the wireless device 12 communicates with a base station and radio network interface, such as, for example, a base station controller 52 associated with a first wireless network, and a base station and radio network interface, such as a base station controller 54 associated with a second wireless network. The first wireless network generally comprises the base stations and radio network interfaces 52, a mobile switching center (MSC) 56, home location register (HLR) 58 and the PSTN 20. The second wireless network generally comprises base stations and radio network interfaces 54, a MSC 60, HLR 62, a data network 64 and a packet switched public network 28 configured as shown in FIG. 2.

Assume that the first wireless network represents a wireless network with 2G capabilities and the second wireless network represents a network having 3G capabilities. The first wireless network comprises base stations and their associated base station and radio network interface s 52 communicating with network nodes such as a MSC 56, and a HLR 58 as is common in the art. The MSC 56 communicates with a PSTN 20 to transmit and receive signals to and from other callers or data sites. Similarly, the second wireless network comprises base stations with their associated radio network interfaces 54 communicating with network nodes such as a MSC 60 or a data network 64. Both the MSC 60 and the data network 64 communicate with the HLR 62. The data network 64 communicates data through a packet switched public network 28 with other wireless devices or other terminal sites as is known in the art. The MSCs 56, 60 both communicate voice and circuit-switched data signals to the PSTN 20.

The network nodes 56, 60 and 64 receive, forward and process calls and data communication as is known in the art. Assume for the purpose of illustrating an embodiment of the invention that the first wireless network supports low speed data services and voice traffic and the second wireless network supports high-speed data related multi-media services such as streaming video.

According to the first embodiment of the invention, the wireless device 12 stores a table that provides a list of preferred service providers from which the wireless device 12 should select. An example table is illustrated in FIG. 3 and will be discussed in more detail below. The table may be a routing table or any other table or grouping of information according to the respective protocol used to direct the wireless device 12 regarding changing its communication link to another platform or service provider. The home service provider downloads the table on a periodic basis to the wireless device 12. The table may then be updated by the network on a weekly, monthly or some other basis such as when the wireless device 12 is powered up or when roaming agreements change or rates for transmitting traffic over various networks change. Although the term "routing table" is used herein, any kind of table of information that can be downloaded to the wireless device 12 is contemplated as within the scope of the invention. Therefore, various wireless interface standards may employ differing kinds of "routing tables" or tables of information that direct the wireless device's registration or communication links.

Downloading the table from the home wireless network to the wireless device may be accomplished using the short messaging service (SMS) or any other means known in the art for transmitting data to a wireless device. Typically, a communication channel is established between the roaming wireless device 12 and the home network. Data, such as an updated table, may be then downloaded to the roaming wireless device 12 for use in determining whether to switch networks or platforms.

Using the table, and when a wireless device is operating outside of its home service area, the wireless device may be able to optimally take advantage of roaming agreements wherein roaming charges on various networks may vary from time to time. For example, carrier A may offer great roaming rates for one month, but then carrier B may compete and offer great rates another month. The table may be periodically revised and downloaded from the home network service provider to provide the roamer with the best rates for roaming service.

FIG. 3 illustrates a roaming wireless device 12 communicating through a current roaming service provider 40 with the home service provider 42. Using this arrangement, the wireless device 12 can receive the updated table for the present invention.

Figure 5:
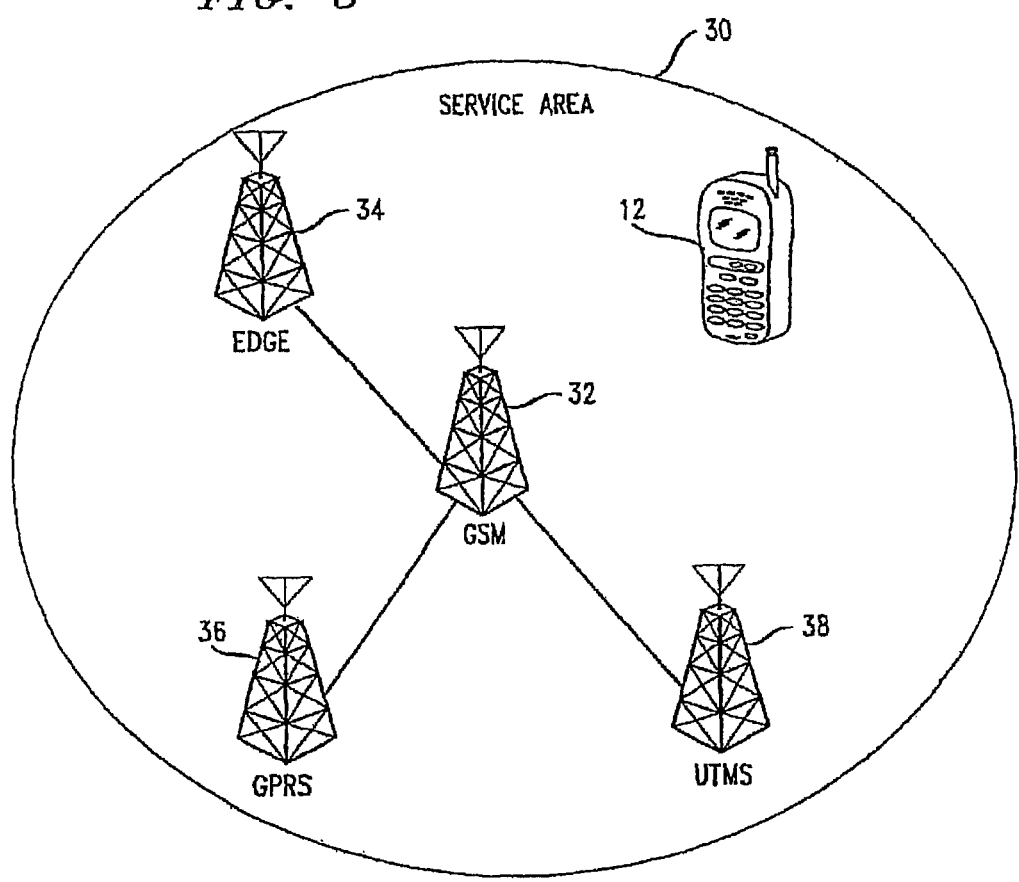
FIG. 5 illustrates a single service provider offering a variety of platforms for its subscribers.

Turning for a moment to FIG. 5, this figures illustrates a roaming service area 30 wherein a roaming service provider provides several platforms of service. For example, GSM 32, EDGE 34, GPRS 36 and UTMS 38 services may be provided to a wireless device 12 from the same service provider. In this regard, the "network selection" is more appropriately termed here a "platform selection" wherein the wireless device will switch say from GSM services to GPRS services without reregistering with a new service provider but switching a communication link from one platform to another. The example "portfolio" of services 32, 34, 36, 38 is not meant to be limited to only these kinds of services. These platforms 32, 34, 36, 38 may be provided within the same frequency spectrum or different spectrums depending on the country in which the services are provided and the division of spectrum within the administrative structure of each country.

Returning to FIG. 2, when a user powers on a wireless device it attempts to register for service with a wireless network. The wireless device 12 references the table and determines which services the wireless device 12 is requesting and which network the user should register with to receive those services. For example, as shown FIG. 2, assume the wireless device 12 attempts to register with the 2G network base station 52 but the wireless device 12 requests a streaming video service. As in our example above, the 2G network is for low-speed data and would be insufficient to support the needs of the wireless device 12 service request at a predetermined parameter level. In this example, the 3G network has ample capability to deliver high-speed data. Assume that the 2G network proceeds to communicate with the wireless device 12. The initial registration process between the wireless device 12 and the 2G network occurs according to the respective protocol of the network on which the wireless device 12 is attempting to register. These protocols are known to those of skill in the art and will not be repeated here.

As the wireless device 12 is registering with the network, the network node 56 receives information regarding the streaming video service requested by the wireless device 12. The 2G network realizes that its capabilities are limited for the service requested. An algorithm operating on the wireless device 12 references the table and instructs the wireless device 12 to register with the 3G wireless network according to the data in the table. In this manner, the wireless device 12 may register with the appropriate network that can handle its high-speed data request.

FIG. 4 illustrates an exemplary roaming table. As shown in FIG. 4, the first column represents a first preferred roaming partner in a 2G network, and a second preferred partner on a 2G roaming network, and so on until the "Nth" preferred partner has been designated. The second column represents a similar layout for 3G networks. The third column provides a first roaming partner on a Quality of Service basis through to the Nth preferred roaming partner on the same basis. The "i" in the third column represents the various quality of service requirements associated with a service provider but high speed. Thus, the "i" relates to the certain level or quality of service and may comprise various factors in determining a threshold quality of service acceptable for a give request for service. The roaming wireless device will look to the first columns of the table for initial registrations and will rely on the quality of service column to register for a specific service. As is known in the art, roaming arrangements are accomplished by agreements between the parties.

Quality of service relates to a particular service request. For example, if a user subscribes to a service bucket (collection of services), he or she probably would like to pay $50 for guaranteed minimums of 50 kbps data or someone else may want to pay $100 per month for 384 kbps. The data profiles will be involved in decision-making, traffic, or service switching process across different platforms and networks. A table, such as that shown in FIG. 4, may be modified according to any of the parameters outlined above. For example, suppose a wireless device 12 is communicating in a roaming situation with a first wireless network. The home network may receive data that for a service request from the wireless device, a second network is better suited either in terms of quality of service, cost of service, system capacity, system coverage, supported applications or services, business factors, or other factors to process that service request. Each of these features may be associated with predetermined parameters that the wireless device 12 and/or network utilize in making decisions regarding which network to switch registration with the process a service request. The home network can modify a table and download the table to the wireless device 12 to direct the wireless device to change its wireless service provider to one of the other networks more capable of processing a service request.

The table of FIG. 4 relates more specifically to the aspect of the invention related to a network selection. However, a table of generally similar arrangement may be used to accomplish the aspect of the first embodiment of the invention wherein a different platform within a roaming or home service provider's portfolio of services is more suitable to service a wireless device's service request. The parameters used to switch platforms within the portfolio of services offered by a service provider are similar to those for network selection: cost of service, quality of service, network load, platform traffic load, etc. Predetermined parameters may be set which assist in the determination of when to switch to a different platform or different network based at least in part on whether a currently servicing service provider can meet a service request within a predetermined set of parameters. For example, assume the current network receives a service request from a wireless device for multi-media services and the current cost of processing the request on the current network is outside the predetermined parameters for cost of service. In this case, the system will took to other platforms or other networks to process the request at a lower cost that falls within the predetermined parameters.

The factors outlined above are not meant to be limiting by any means. Quality of service relates to bandwidth and system capabilities. The cost of service relates to the cost of transmitting voice or data over a particular network at the present cost structure. The cost of service may relate to the charge to the subscriber or the cost to a service provider for the support and equipment to fulfill a subscriber obligation. The system capacity relates to both a system load capacity of a presently serving network and a network within a plurality of networks that may begin to service a wireless device. In other words, the network or wireless device according to the first embodiment of the invention may analyze both system capacity and a threshold value at which the serving network and potentially receiving network are operating. If a threshold value is met (say, for example, 90% capacity for the serving network), then the wireless device with a service request will be instructed to look elsewhere for processing that request.

The parameter involving system coverage relates to determining which network on which a wireless device seeks to register based on the coverage area of the wireless network presently serving the wireless device. This may also be a combination of the coverage area for the presently serving network and the potential service provider. The parameter related to applications supported means that the decision discussed herein for a wireless device to register with-a particular network may turn on the applications supported by that network. Thus, if a wireless device has a service request for stock quotes, and only a specific roaming wireless service provider has stock quotes, the decision-making process accordingly directs the wireless device to search for and register with the roaming service provider.

Figure 7A:
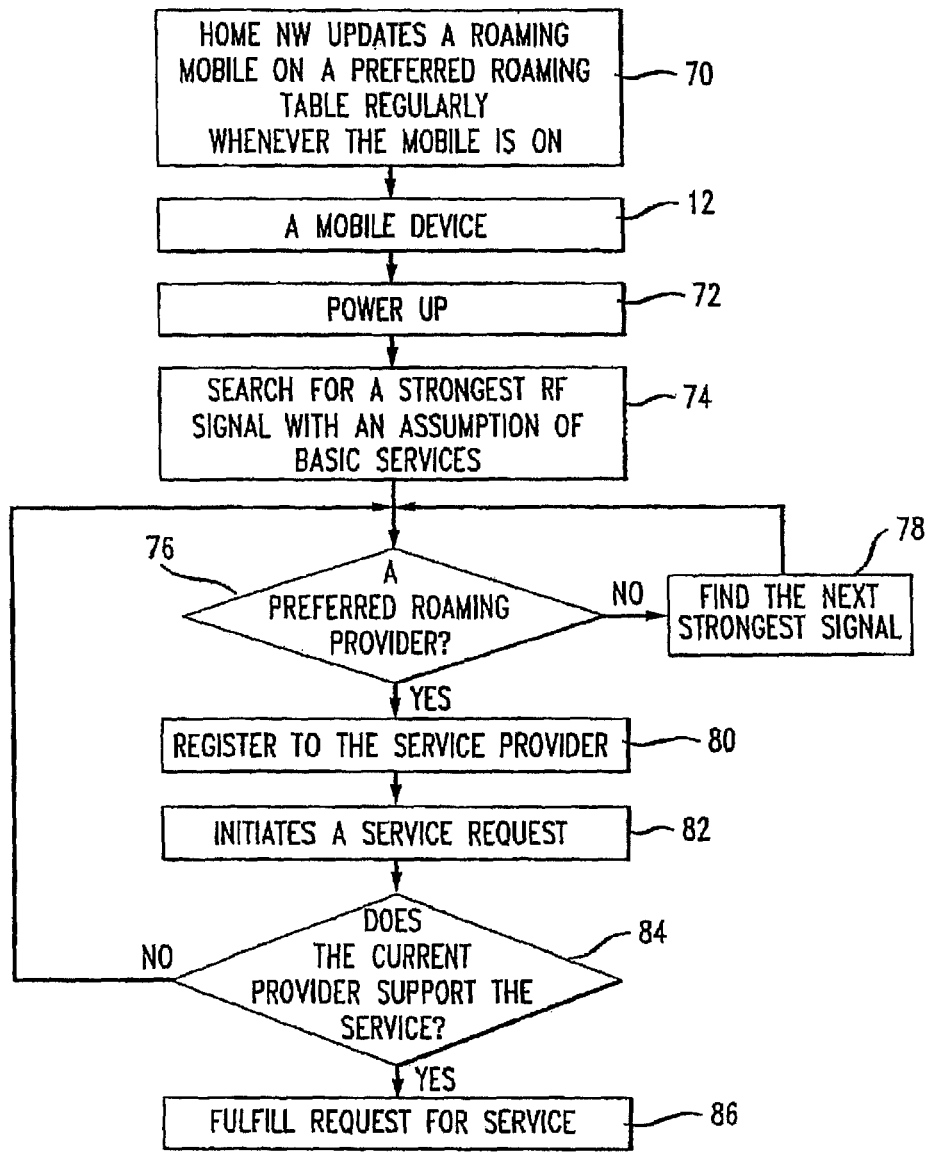
FIG. 7a is an exemplary flow chart of the registration process for a roaming 20 wireless device in an area covered by 2G and 3G networks.

FIG. 7a illustrates a process according to the first embodiment of the present invention. As shown in FIG. 7a, the home network updates a roaming wireless device 12 on a preferred roaming table on a regular basis preferably when the mobile device 12 is on (70). Assuming that the latest roaming table has been downloaded to the wireless device 12, the method according to the second embodiment of the invention proceeds as is shown in FIG. 7a.

First, the user powers up (72) the wireless device 12 and searches for a strongest RF signal with an assumption of primary service that the wireless device 12 supports will be provided by the service provider (74). In one variation of the invention, when the user powers up, the table will coordinate with the hardware capabilities of the wireless device 12 to modify the search schedule for a service provider. For example, a wireless device 12 may have a PCMCIA card and therefore prefer to first register with a network capable of providing high-speed data-related connections over a voice-only connection. In this regard, a device having a primary service capability will first seek to register with corresponding service providers (for example, those offering high-speed data processing service providers offering the preferred services are first sought out. In yet another variation of this approach, the wireless device 12 may first register with a narrow-band service provider, and then upon the wireless device 12 making a service request, it will inquire as to which service provider can provide a certain quality of service based on the hardware capabilities of the wireless device 12. The wireless device listens to its control channel for the operation code of the strongest signal. The routine searches for a preferred roaming provider according to its roaming table (76). Of all the preferred roaming providers, it searches until it determines which one has the strongest signal (78). Once wireless device 12 finds the strongest signal of a preferred roaming provider, the wireless device 12 registers with the service provider (80). The manner of registering a wireless device 12 differs according to each particular network. Therefore, the details of the registration process are not included herein. The wireless device 12 then initiates a service request (82) and the routine determines whether the current service provider can support the requested service (84) at a certain predetermined parameter level. If no, then the process routes the decision path back to searching for a preferred service provider according to the stored table and having the strongest signal (76, 78). If the current service provider supports the requested service (84), then the service provider responds to the request for service (86) carries out the necessary steps to provide the requested service.

Figure 7B:
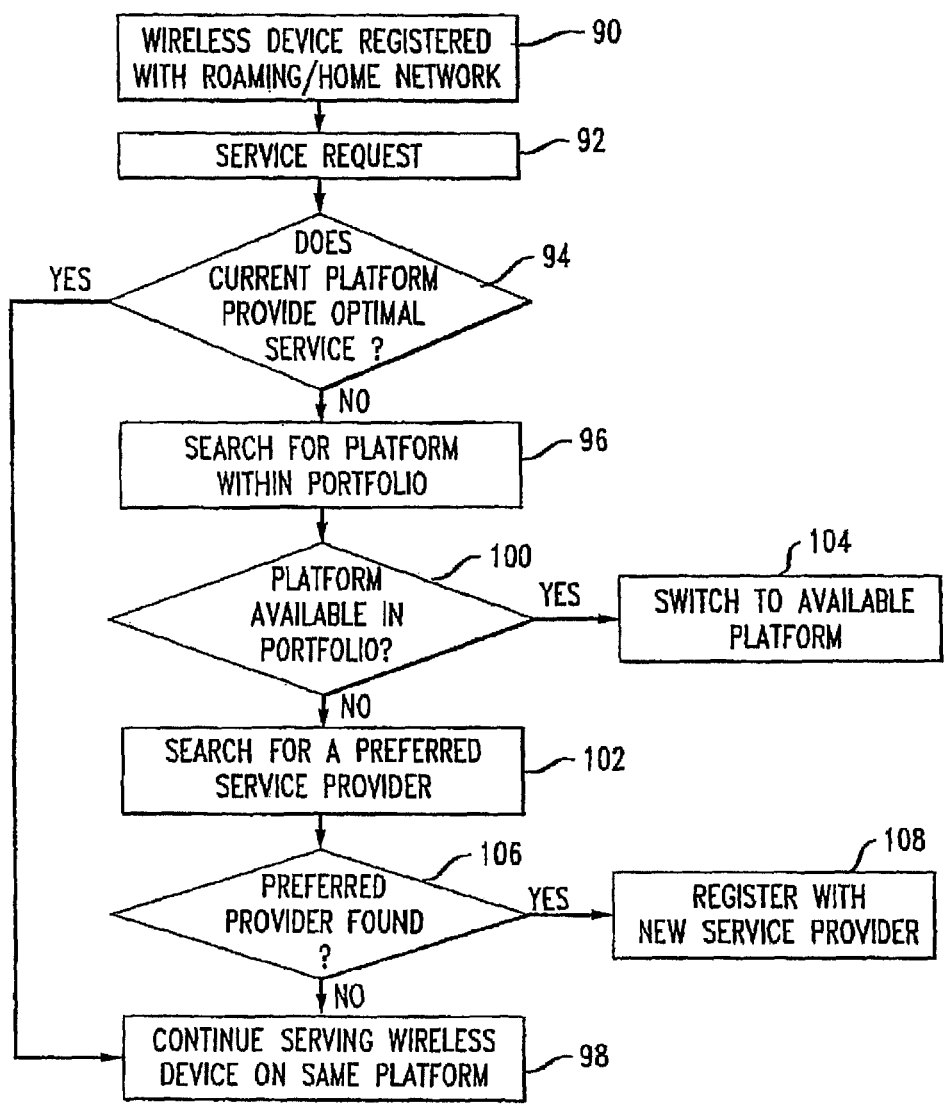
FIG. 7b illustrates an exemplary flow chart for directing wireless device to change communication links to a new platform to process a request for service.

Also in the roaming environment and with reference to FIGS. 5 and 7b, the decision making process may be between platforms in a portfolio of platforms offered by a service provider rather than between networks. As shown in FIG. 7b, the routine assumes that the wireless device 12 is registered with a service provider (90) as is known in the art. A new service request is received (92) from the wireless device 12. The routine inquires whether the current platform provided by the servicing service provider optimally provides the requested service (94). If yes, then the current service provider continues to service the request (98). If no, then the routine searches for other platforms within the process the request (96).

In this platform-based scenario, preferably, the service provider will direct the wireless device 12 to another platform within its portfolio. When a service request arrives at the service provider, the current service provider will determine whether the request can be serviced through its existing portfolio of platforms. If one of these platforms can service the request, the current service provider (whether roaming of in the home service area) instructs the wireless device 12 to reconnect to the new platform. In a variation of this preferred method, and as an aspect of the first embodiment of the invention, instead of the network directing the reconnection to another platform, the table may be modified to include information regarding the current service provider's platform portfolio. In this case, the wireless device 12, upon making a service request that is not serviceable by the current service provider, will check its table for information regarding other platforms within the current service provider (whether a roaming or home service provider) portfolio. The table may be organized to instruct the wireless device 12 to first seek out other platforms within the current service provider's portfolio before seeking out a preferred, but different, service provider.

For example, suppose a wireless device 12 requests a service requiring GPRS capabilities. If the currently servicing platform of the current service provider does not have GPRS capability, the wireless device 12 may look to its table to determine if information exists regarding other platforms within the current service provider. If the 5 regarding other platforms within the service provider's portfolio and data regarding the roaming agreement between the home service provider and the roaming service provider which enable the use of the other platforms in the portfolio. If another platform is available for the wireless device 12 to use, it will seek to reconnect to that new platform within the portfolio before seeking to reregister with a different service provider to receive the GPRS service it requests.

The routine inquires whether any of the other platforms offered by the service provider are available to service the request (100). In this sense, "available" may mean capable of servicing the request at a predetermined parameter level or available at any level of service. If the service provider has another platform available to service the request, then the wireless device 12 either switches entirely or creates a parallel communication link with the new platform to service the new request (104). If no other platforms are available, then the routine searches for another preferred service provider to service the request (102). After the search of available networks, the routine inquires whether a more optimal network was found (106). If no, then the current platform servicing the wireless device continues to service the new request (98). If a new network is available that can more optimally service the request for service, then the routine requires the wireless device to re-register with the new service provider (108).

As can be understood from the above description, the process may involve first checking the portfolio of platforms available from a currently serving service provider before de-registering with the current service provider and looking for another service provider to process a request.

Mobile Device-Based Selection while in the Home Serving Area

Suppose that FIG. 2 now relates to the service area 30 being the user's home service area. All the other descriptions are the same as those in FIG. 2. When the service area 30 is the user's home service area, a similar problem exists when the home service provider communicates with a wireless device 12. Assume in this case that the home service provider uses base stations/radio network interfaces 52, various MSCs 56, 60, Data networks 64, HLRs 58, 62, the PSTN 20 and the packet-switch public network with service within the same home network area 30 that have the necessary services.

Figure 6:
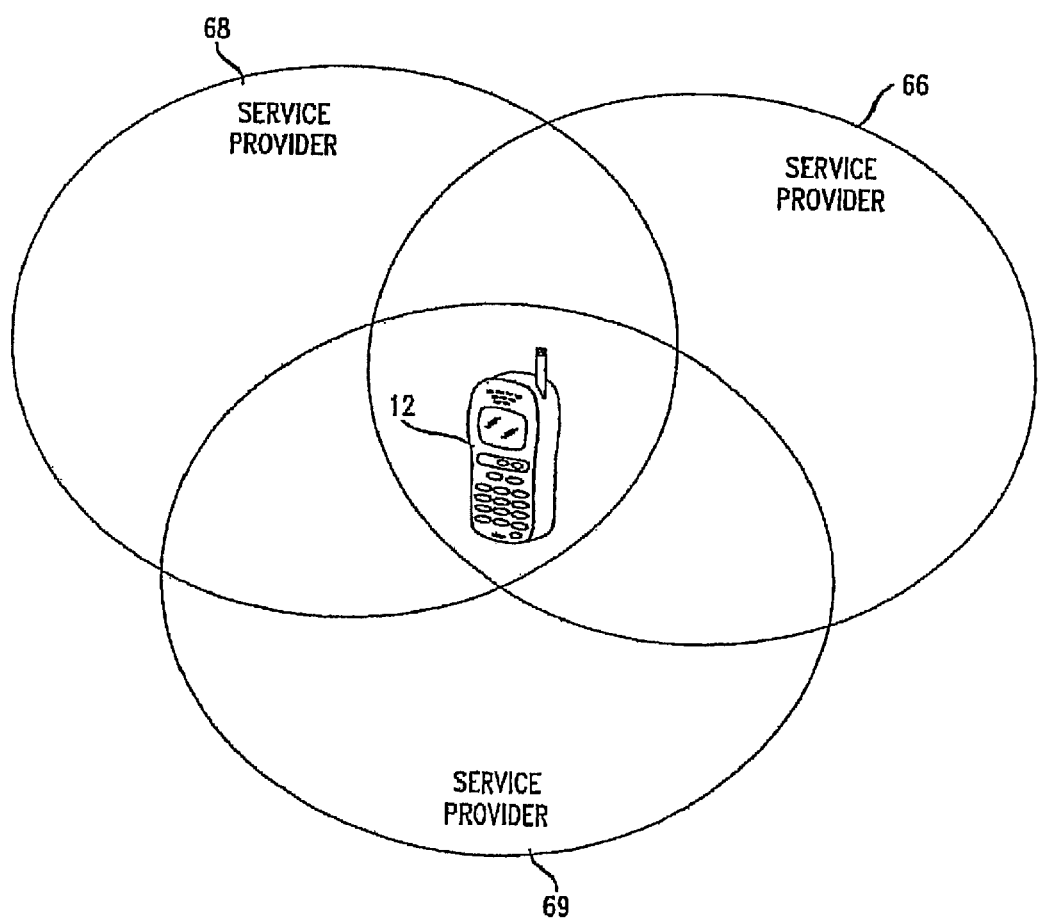
FIG. 6 shows a home service provider with roaming service providers having overlapping coverage areas.

The second aspect of the first embodiment is further illustrated with FIG. 6, wherein a home service provider area 66 overlaps with a first network service provider 68 and a second network service provider 69. As can be seen, the various "cells" overlap in their coverage area although they mainly differ in transmission frequency.

The home service provider has roaming agreements with other service providers 68, 69 although the service area for these service providers overlaps with the home service area 66. As with the first aspect of the first embodiment of the invention, the wireless device 12 initiates a request for a particular service, such as a multi-media operation. When the home service provider cannot optimally service the request, the wireless device 12 references its table to determine which roaming network it should register with to receive the service. The table used in the second aspect of the first embodiment of the invention is similar to that shown in FIG. 4.

In addition to have a table direct the wireless device 12 to different networks based on their capability, the table may also direction the wireless device 12 to a different platform within the portfolio offered by the home service provider 66. This arrangement is illustrated in FIG. 5. For example, the home network service provider may provide a portfolio of differing services, such as UTMS 38, GSM 32, GPRS 36, and EDGE 34. In this case, changing from one platform to another may not require a complete re-registration process with a new network. Changing platforms may mean reestablishing a link from wireless device 12 which has a connection with a GSM network to connected to, say, the UTMS to the GPRS (packet switched). The table may be modified in order to provide such instructions to the device.

Network-Based Selection when Roaming

The second embodiment of this invention relates to a network-based decision making process for changing a network or platform according to a service request from a wireless device. A first aspect of this invention relates to a roaming wireless device and a second aspect of the second embodiment of the invention relates to a wireless device in its home service area. The basic elements of a wireless service provider network are shown in FIG. 2.

According to the first aspect of the second embodiment, assume for example that the wireless device 12 registers with a roaming 2G network node 56. A software application operating on the wireless device 12 establishes a low bandwidth communication with its home network 42 (See FIG. 3). The home network 42 communicates with the wireless device 12, such as, for example, through a short messaging service. It is preferable that the communication between the home network 42 with the wireless device 12 is in real-time, but depending on the means used to communicate instructions to the wireless device 12, some latency may be involved. In such messages, data and instructions are provided from the home network 42 for directing each service request to the appropriate network. Dynamically updating the table in this manner enables the wireless device 12 to take advantage of any special criteria associated with the roaming agreements.

For example, a short-time offering of a special low price for bandwidth on a 3G network may be available for a few hours. If the special offering comes after a mobile device 12 has powered up and received an updated table, but before the user makes a multi-media use request, then the wireless device 12 may not be directed to take advantage of the better rate when searching for the optimal network to process the multi-media request. However, according to one aspect of the present invention, the user can dynamically download network selection instructions at the time of the request for service.

With a new service request, the wireless device 12 establishes a communication link with its home service provider 42. The home service provider 42, with updated tables or other databases regarding the geographic location of the wireless device 12, current roaming agreements, and current prices for transmission of voice/data on network can more optimally service the request, then the home network 42 transmits a signal, which may be an SMS message or the like, to instruct the wireless device 12 to reregister with the chosen roaming network.

The wireless device 12 may then establish a secondary registration with the new chosen service provider or may de-register with the current network and re-register with the chosen network for processing the new service request. In this manner, communication or service from the wireless device 12 with specific needs may be dynamically assigned to the appropriate network.

Figure 8A:
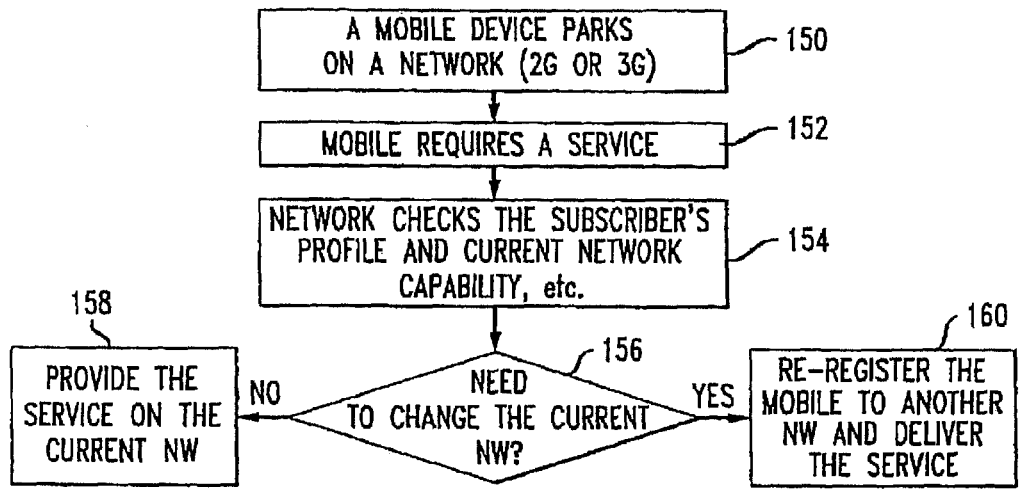
FIG. 8a illustrates a flow chart for a network-based selection of network and services.

The process according to the first aspect of the second embodiment of the invention is illustrated in FIG. 8a. A wireless device 12 parks on a roaming network (150). The wireless device 12 then requests a service (152) by transmitting a signal to the network on which the wireless device 12 is parked. The network checks a subscriber profile and a current network capability (154). In the roaming scenario, the network servicing the roaming wireless device 12 will establish a communication link with the home network 42 to review the home database or table to determine network selection. A number of parameters may be used to determine how the home network will instruct the wireless device 12 to reregister with a new network or stay camped on the current network. Given the data received from the home network 42 at the wireless device 12 and the other parameters checked, the routine determines whether to change from the current network (156). If the current network should not be changed, the current network continues to provide the requested service (158). If there is a need to change the current network (156), then the routine re-registers the wireless device 12 to another network to service the wireless device (160).

The first aspect of the second embodiment may also apply when a service provider is servicing a roaming wireless device 12 and offers a portfolio of platforms, such as GSM 32, GPRS 36, UTMS 38, or EDGE 34, shown by way of illustration in FIG. 5. In this case, the home wireless network will determine first of the platforms available through the servicing network whether another platform will best serve the service request. If so, then the home wireless network 42 will direct the wireless device 12 to establish a communication link with the different platform within the portfolio. The communication link may not involve a re-registration process as would be used in switching networks entirely.

For example, assume a wireless device 12 is roaming in London and makes a GPRS related service request to browse traffic conditions. Suppose the wireless device 12 is currently on the GSM platform of the current service provider. The request may be sent first to its current service provider. If the current service provider's GSM platform does not have GPRS capabilities, but a GPRS platform is within the portfolio of the current service provider, the current service provider will transmit a signal or message to the wireless device 12 instructing it to change its communication connection from the GSM platform to the GPRS platform to service the request. This will preferably be done according to information stored at the current service provider network or home service provider and include references to roaming agreements and a subscriber profile. In a variation on this aspect of the invention, when the wireless device 12 transmits a service request to the current service provider, the request can be forwarded to the home service provider. The home service provider can then transmit a message to the wireless device 12 instructing it regarding whether to reconnect with a different platform within the current service provider's portfolio or to re-register with another service provider having the capability to service the data request. The home service provider then transmits information or a message with a procedure to reconnect or reregister for service.

Network-Based Selection while in the Home Serving Area

In a second aspect of the second embodiment of the invention, the network-based decision-making process operates when the wireless device 12 is in a home service area 66 (See FIG. 6). This aspect of the second embodiment of the invention may also be illustrated using FIG. 8a. The method comprises a wireless device 12 parking on its home 2G or 3G network (150). The wireless device 12 makes a request for service to the home network (152). The home network 42 checks a subscriber profile, a current network capability or other operational parameters and compares those parameters to data stored in the home network database (104). In the second aspect of the second embodiment of the invention, the home network 12 may only provide some of the necessary services, but other networks 68, 69 having a service area overlapping the home serving area footprint 66, as shown in FIG. 6, may provide those additional services. The home network service provider 42 may have roaming agreements with the other networks for these services.

The routine determines whether to change from the home network (156). If the home network 42 can optimally service the request or service the request within predetermined parameters, the home network 42 provides the requested service (158). If there is a need to change the current network (156), then the routine direct the wireless device 12 to re-register with another network (160).

As with the first aspect of the second embodiment of the invention, the second aspect also relates to the home network 42 operating to determine whether a wireless device 12 communicating with a platform within the portfolio of platforms offered by the home wireless carrier should switch to another platform within that portfolio to receive more optimal service.

Figure 8B:
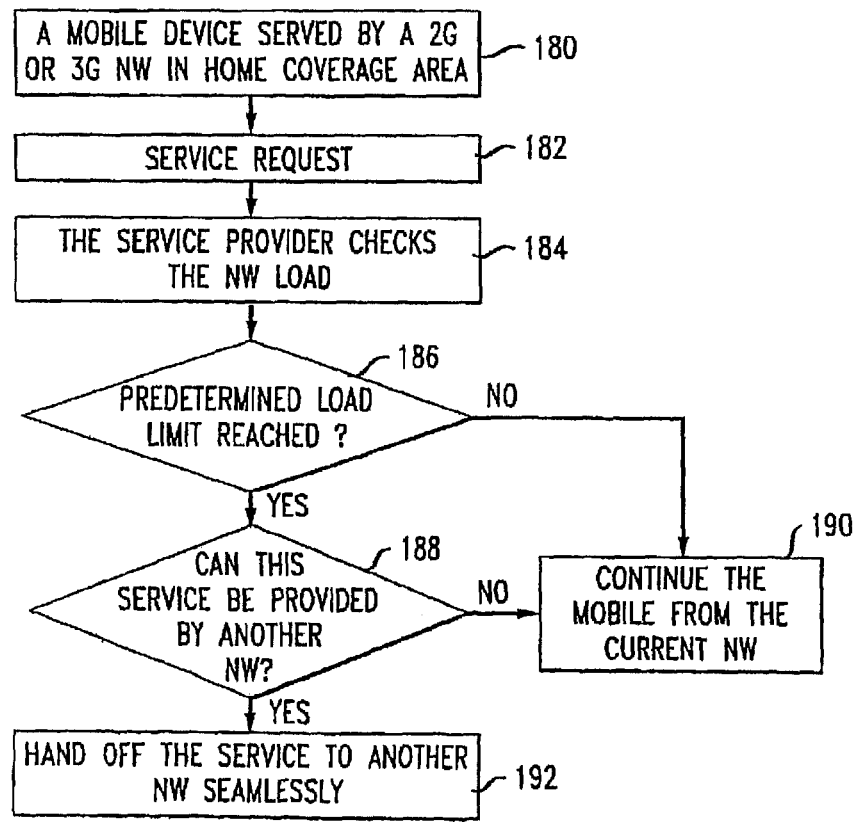
FIG. 8b illustrates a flow chart of a network based network and service selection algorithm for service re-routing in a home service area.

Another variation on the second embodiment of the invention is shown in FIG. 8b. In this variation of the invention, it is assumed that the wireless device 12 is served by a 2G or 3G network (180) within the subscriber's home coverage area 66. A service request is received by the wireless device (182). The service provider checks the network load (184). The routine determines whether a predetermined load limit has been reached (186). If the load limit has not been reached, then the routine continues to service the wireless device 12 from the current network (190). If a predetermined load limit has been reached, then the routine determines whether another network can provide the requested service having overlapping coverage in the home service area (188).

If another network within the home service area 66 can provide the service, the other network can provide requested service, then the routine hands off the wireless device 12 to the other network capable of providing the requested service (192). If no, another network cannot provide the requested service then the subscriber remains with the current home network to receive the requested service (190).

The step of choosing at least one network from the plurality of networks to provide services may be accomplished according to a variety of aspects of the second embodiment of the invention. For example, different networks will offer varying quality of service. E-mail services can tolerate high delay while streaming video must be serviced according to a minimum data rate and can tolerate only moderate delay. Voice services demand both a minimum data rate, at least while a person is speaking, and very low delay.

Therefore, when a high quality of service is required, the routine chooses a network that provides the necessary bandwidth to be able to fill the service requirement. The algorithm may make the decision on which network to choose based on the cost of the service or any other factor. A particular user of a wireless device 12 may have cost restraints that have priority over bandwidth needs. In this regard, the process may choose a network primarily based on the cost of the services rather than bandwidth needed. In this regard, the decision making process may involve referencing a particular user profile to evaluate whether the predetermined parameters are met for a particular service request.

Another aspect of the second embodiment of the present invention relates to the service provider requesting offers from other service providers for processing a single service request or an aggregated group of service requests. In this aspect of the second embodiment of the invention, the network will receive a service request and submit a. request for an offer of service from at least one different service provider. In this manner, the current service provider seeks to obtain the best value before directing the wireless device 12 to a particular service provider. The value may be related to quality of service and cost, the subscriber's profile and desires for quality of service over cost or cost over quality of service. Other factors may also be involved in evaluating the received offers.

The request for an offer may be related to either a single service request or an aggregated group of service requests. If for an aggregated group, preferably, the current service provider will use a group of similar service requests currently pending. For example, the service provider may have 500 current requests for GPRS service from wireless devices currently on GSM platforms. The service provider may determine that 400 of these requests must be serviced by different service providers because 100 of the service requests will be directed to GPRS platforms within the current service providers' outstanding service requests). The current service provider submits a request for offers to at least one different service provider. The different service provider(s) then make offers for processing the service request(s). The current service provider evaluates the offers and makes decisions regarding directing the wireless device(s) to different service providers based on the accepted offer.

The offer accepted may involve individual wireless devices. For example, the evaluation process may involve comparing the offers to individual subscriber profiles and tolerances for cost of service versus quality of service. Therefore, the offer from a first service provider may be a very low cost for service but a certain threshold of bandwidth. The first service provider's offer may be more advantages for 100 of the 400 subscriber service requests according to the subscriber profiles. Therefore, the service provider will direct those 100 wireless devices to reregister with the first service provider. However, a second service provider may offer high bandwidth service at a high cost. This offer may be acceptable to the other 300 subscribers who prefer quality of service over cost Therefore, the current service provider will accept the offer from the second service provider for 300 subscribers and direct them to reregister with the second service provider.

Figure 9:
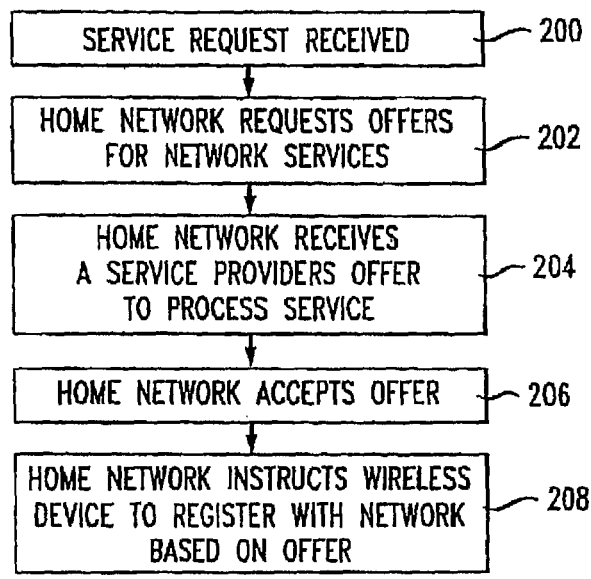
FIG. 9 shows a flow chart illustrating a routine for a home service provider to request offers for network processing time.

This process is illustrated in FIG. 9. The routine illustrated in FIG. 9 may relate to a wireless device 12 operating within a home network area 66 or while roaming outside its home area. As shown, a service request is received from a wireless device (200). The home network 42 submits a request for an offer for wireless services to a computer server operating as an exchange for telecommunications processing services (202). The request for an offer may be for the cheapest price for processing the service request for the wireless device 12, or it may be for a certain processing speed available from other networks, or for other features and combinations of data.

Further, the request for an offer of step (202) may be an aggregate request embodying all of the service requests currently received by or pending with the home/roaming service provider. In this regard, suppose a home service provider currently has 1000 multi-media service requests for roaming subscribers in London, the request for an offer (202) may be lower or adjusted based on the real-time volume of subscribers seeking a certain service.

The current service provider receives and considers offers to process the individual service request or the aggregate request from other service providers (204). The current service provider, if appropriate based on its parameters, accepts one of the offers (206) and instructs the wireless device 12 to register with or change its communication link to the network with the accepted offer to process the service request.

Figure 10:
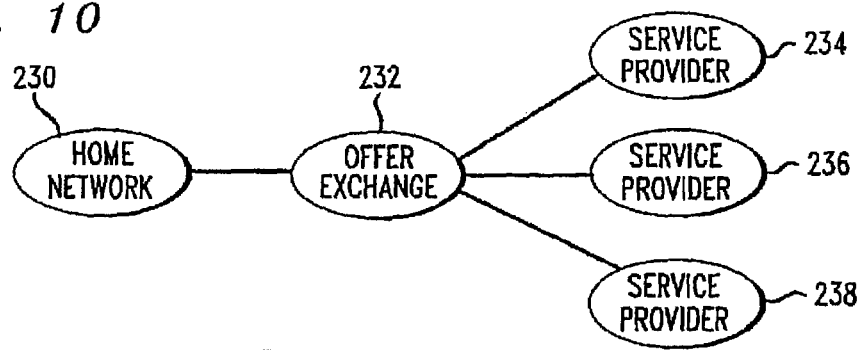
FIG. 10 illustrates an exemplary system for enabling a home service provider to request offers for network processing time.

FIG. 10 illustrates the bidding arrangement. The current service provider 230 communicates its single or aggregate request for an offer to an offer exchange computer server 232. Other service providers 234, 236, 238 communicate with the offer exchange server 232 and when a request is submitted, they will analyze the request and make offers based on their network load, capacity, pricing or other parameters. When an offer is accepted by the service provider 230, it can then direct its wireless device 12 or wireless devices to the appropriate service provider.

The current service provider, even if a roaming service provider, may also bid for services and either submit a single bid for the requested service from a wireless device 12 or may submit an aggregate bid according to all the pending or current service requests that are sufficiently similar in nature regarding the kinds of services requested, that they may be aggregated into a single aggregate bid for services.

Figure 11:
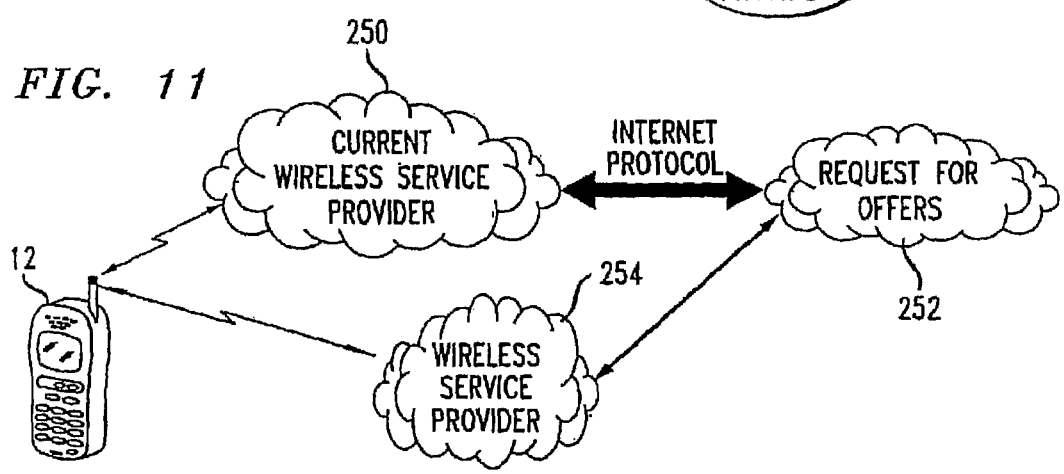
FIG. 11 illustrates an exemplary system for enabling a wireless device to request an offer for a network to process service requests.

FIG. 11 illustrating a variation of the request for an offer for processing services. In this case a wireless device 12 is being currently served by a current wireless service provider 250. The current wireless service provider 250 may be a home service provider or a roaming service provider with a roaming agreement with the wireless service provider. The wireless device 12 may submit a special service request for services. However, in contrast to the other approaches discussed herein, in this embodiment, the wireless device 12 submits the request for service to an open bid server 252 through using a connection, such as an IP tunneling function or other means known to those-of skill in the art for transmitting such a request. The bid server 252 can store all present deals offered by different wireless service providers. That is, service providers submit or transmit information regarding data transmission offers they have available to the bid server 252 for processing and presenting to requests for offers from wireless devices 12.

In this regard, suppose that wireless service provider 254 has an offer for wireless transmission of 5 MB of data during a certain period of time for $5. That offer is transmitted to the bid server 252. The wireless device 12 requests an offer from the bid server 252 and receives the offer from the service provider 254, as well as other offers from other service providers (not shown) that have submitted offers to the bid server. The wireless device 12 obtains that information from the bid server 252 and can make decisions regarding which service provider to use for processing the data request.

The wireless device 12 evaluates the offers, its hardware capabilities, the nature of the service request and determines whether, based on these parameters, one of the offers is acceptable. If the wireless device 12 accepts an offer, a special access permit such as a special code may be provided from the bid server 252 to the wireless device associated with the accepted offer. The wireless device 12 can communicate with that service provider using the access permit or special code and request to logon to transmit the data. If the process involves the wireless device 12 receiving the special access permit from the bid server 252, when the wireless device logs onto the chosen wireless service provider 254, the request can be recognized and processed.

The processes outlined above may also be accomplished through hardware, software or firmware and may involve not only processing on the wireless device 12 operation unit (not shown), but may also involve processing on various network nodes, including the home service provider, roaming service provider, or on a platform that is independent from any service provider. For example, the step of evaluating offers according to parameters such as cost or bandwidth available may take place either on the wireless device 12, the home/roaming service provider 250, or on some other platform operated by an entity independent of the service providers.

Although the above description may contain specific details, they should not be construed as limiting the claims in any way. Other configurations of the described embodiments of the invention are part of the scope of this invention. Accordingly, the appended claims and their legal equivalents should only define the invention, rather than any specific examples given. Specifically, any functionality referred to in this disclosure should not be incorporated in or imposed as a requirement in a doctrine of equivalent analysis of the claims.

We claim:

1. A method comprising:
    downloading, by a processor of a network, a table from the network to a wireless device, the table listing a plurality of wireless networks;
    receiving, by the processor, a service request for an application service from a plurality of application services; and
    when a first wireless network of the plurality of wireless networks is capable of providing the application service within a predetermined parameter for the application service, based on an applications supported parameter associated with the first wireless network of the plurality of wireless networks, directing the wireless device to choose the first wireless network of the plurality of wireless networks to provide the application service.

2. The method of claim 1, wherein the directing the wireless device to choose the first wireless network further comprises directing the wireless device to choose the first wireless network based at least in part on a quality of service.

3. The method of claim 1, wherein the directing the wireless device to choose the first wireless network further comprises directing the wireless device to choose the first wireless network based at least in part on a cost of service.

4. The method of claim 1, wherein the directing the wireless device to choose the first wireless network further comprises directing the wireless device to choose the first wireless network based at least in part on a preferred provider agreement.

5. The method of claim 1, wherein the directing the wireless device to choose the first wireless network further comprises directing the wireless device to choose the first wireless network based at least in part on a network capacity.

6. The method of claim 1, wherein the directing the wireless device to choose the first wireless network further comprises directing the wireless device to choose the first wireless network based at least in part on a network load associated with a second wireless network presently serving the wireless device.

7. The method of claim 6, wherein the directing the wireless device to choose the first wireless network further comprises directing the wireless device to choose the first wireless network based further on a wireless network load of other wireless networks of the plurality of wireless networks.

8. The method of claim 1, wherein the table is downloaded on a periodic basis.

9. The method of claim 8, wherein the table is downloaded on the periodic basis according to an updated roaming agreement.

10. The method of claim 8, wherein the table is downloaded on the periodic basis according to when the wireless device is on.

11. The method of claim 1, wherein the wireless device is roaming outside a home service area.

12. The method of claim 1, wherein the wireless device is operating inside a home service area.

13. A method comprising:
    establishing, by a processor, a connection between a wireless device and a network, wherein the establishing the connection comprises establishing a low bandwidth connection between the wireless device and the network when the wireless device is registered with a roaming service provider;
    maintaining, by the processor, a table listing a plurality of wireless networks;
    receiving from the wireless device, by the processor, a service request for an application service from a plurality of application services; and
    directing a selection of a first wireless network of the plurality of wireless networks based at least in part on whether the first wireless network of the plurality of wireless networks is capable of providing the application service within a predetermined parameter for the application service, based on an applications supported parameter associated with the first wireless network of the plurality of wireless networks.

14. The method of claim 13, wherein the directing the selection further comprises choosing the first wireless network based at least in part on a quality of service.

15. The method of claim 14, wherein the quality of service relates to a threshold level of toleration for delay in data transmission.

16. The method of claim 14, wherein the quality of service relates to a minimum data rate.

17. The method of claim 14, wherein the quality of service is associated with a network load of a second wireless network currently servicing the wireless device.

18. The method of claim 17, wherein the quality of service is further associated with a network load of wireless networks of the plurality of wireless networks with which the wireless device is to register.

19. The method of claim 13, wherein the directing the selection further comprises choosing the first wireless network based at least in part on a cost of service.

20. The method of claim 13, wherein the directing the selection further comprises choosing the first wireless network based at least in part on a preferred provider agreement.

* * * * *